Patented June 13, 1939

2,161,934

UNITED STATES PATENT OFFICE 2,161,934

RUBBER COMPOSITIONS

Willis E. Reichard, Elyria, and Robert R. Olin, Akron, Ohio, assignors to The Worthington Ball Company, Elyria, Ohio, a corporation of Ohio No Drawing. Application December 18, 1937, Serial No. 180,550

11 Claims. (Cl. 260—3)

Our invention relates to improvements in rubber compositions and processes, and relates more particularly to an improved rubber composition adapted as covering material for golf balls.

It has heretofore been proposed to form cover stock for golf balls from a mixture of rubber, balata, and a suitable pigment. However, balata is relatively expensive and, although it is known to impart toughness to a rubber compound, it is desirable that the amount of balata employed be kept at a minimum. Again, it has been necessary to vulcanize the rubber or balata or both to provide a suitable compound, resulting in a relatively expensive manufacturing process.

Additionally, it is difficult to control the characteristics of a compound having a high percentage of balata, which results in high manufacturing costs.

We have found that a cover stock for golf balls having improved characteristics may be provided by a mixture of vulcanized or unvulcanized balata, vulcanized or unvulcanized rubber, a suitable pigment and synthetic resin. The resins employed are formed by polymerization of vinyl compounds under suitable conditions. Various methods as well known in the art may be employed for effecting the polymerization of the vinyl compounds and the characteristics of the resulting resins will vary over a wide range dependent on the vinyl compounds used as a raw material.

We have found that a vinyl resin formed by polymerization of vinyl-acetate together with a resin formed by the copolymerization of vinyl acetate and vinyl chloride may be combined with balata, rubber, and a suitable pigment to provide tough cover stock for golf balls. Although resin formed by the polymerization of vinyl acetate is not considered compatible with rubber, we find that a tough homogeneous mixture may be formed by the combination of this resin with rubber, balata, and a resin formed by the co-polymerization of vinyl-acetate and vinyl-chloride.

We preferably employ refined natural rubber in an unvulcanized state, although we contemplate that synthetic rubber may be used if desired. We also contemplate that either vulcanized or unvulcanized natural or synthetic rubber latex may be used.

Various means well known in the art may be used in refining the crude rubber to provide a substantially pure product. The balata or like gum is de-resinated by any suitable method to provide a substantially pure unvulcanized gum. The resins are prepared as previously indicated by polymerization of vinyl compounds.

It is an object of our invention, therefore, to provide an improved rubber compound, particularly adapted for covering material for golf balls.

Another object of our invention is to provide a tough, homogeneous rubber compound for use as golf ball cover stock and the like, which is economical to manufacture.

Another object of our invention is to provide an improved rubber compound having characteristics suitable for golf ball covering material, which is not unduly susceptible to cutting blows.

Another object of our invention is to provide an improved cover stock for golf balls, which may comprise either vulcanized or unvulcanized ingredients.

Another object of our invention is to provide an improved process for manufacturing the improved composition of matter as above set forth.

Other objects of our invention and the invention itself will become more apparent by reference to the following specification, which sets forth our invention in the different aspects as we preferably embody said invention.

We preferably employ approximately equal portions of resin and balata, and various proportions of rubber, pigment, and stabilizing agent. We also preferably employ a greater amount of resin formed by the co-polymerization of vinyl acetate and vinyl chloride than the resin formed by the polymerization of vinyl acetate. A typical example would comprise 30% synthetic resin, 30% balata, 16% rubber, 20% pigment, and 4% stabilizing agent. The resin formed by the polymerization of vinyl acetate, in the foregoing example, preferably comprises 20% of the total amount of resin. Any suitable coloring material or pigment may be employed, but we preferably use titanium dioxide.

The stabilizing agent is preferably calcium stearate or lead stearate or line, generally in the proportions of .5% to 3% based on the weight of the resin.

For the purpose of simplifying future reference in this specification to the polymerized vinyl acetate and to the co-polymerized vinyl acetate and vinyl chloride, we will hereinafter refer to the former as "A" resins, and the latter as "B" resins.

The coagulated balata may be thoroughly inter-mixed with the rubber, the synthetic resins, coloring material, and stabilizing agent in any suitable manner, but preferably these are milled together by disposing the rubber and balata between masticating rolls, together with the resin, coloring material, and stabilizing agent, whereby the ingredients will be thoroughly inter-mixed, resulting in a homogeneous mixture upon delivery from the rolls. The ingredients may also be mixed in an internal rubber mixer of the Banbury type.

It is to be noted that we have discovered that the softening points of the "A" type resins are relatively low, while the softening points of the co-polymerized "B" type resins are quite high. We find that it is possible to mill the "A" type resins on the mill with the rolls heated to the temperature of 200° F. or lower, and that it is possible to mill the rubber and balata with the "A" type resins without undue deterioration of the materials, and without causing either the rubber or balata to stick to the mill rolls. It is therefore a comparatively simple matter to mill rubber and balata into the "A" type resins at the ordinary milling temperatures of rubber and balata.

Since the "B" type resins are of a high softening point, they cannot be formed in a smooth sheet on the mill rolls unless they are heated to a higher temperature than the "A" type resins. We find that a temperature of about 300° F. or higher is necessary for this type resin, and since such high temperature may cause rapid deterioration of the rubber and balata if they are milled together at this temperature, and since such temperature causes the same to stick to the rolls making it very difficult to handle, such a high temperature is undesirable. We have found that if a relatively small proportion of the "A" type resins, for example, 5% to 20%, are pre-mixed with the "B" type resins, it is possible to form a smooth sheet of this mixture on the mill rolls at temperatures of 220° F. or lower.

Our procedure thus makes it possible to mill rubber and/or balata into either type resin and obtain a homogeneous mixture at ordinary milling temperatures, and without deterioration of the rubber or sticking of the rubber and/or balata to the mill rolls.

We have also found that chemical plasticizers may be pre-mixed with the "B" type resins to reduce the temperature at which these type resins may be satisfactorily sheeted on the mill rolls, and thus to reduce the softening temperature of the "B" type resins so that rubber or balata may be satisfactorily milled into them. Any suitable chemical plasticizers soluble in the resin or in the resin and the rubber and/or balata may be used, such as dibutyl phthalate. We have found that by using a sufficient amount of plasticizer for reducing the temperature of the "B" type resins that the amount of "A" type resins mixed therewith may be reduced.

Although the relative amounts of the ingredients may vary considerably, dependent upon the use intended for the resulting product, we find that a mixture comprising the approximate proportions by weight as outlined above provide a golf ball cover having the very desirable aforementioned characteristics.

The mixture upon delivery from the rolls may be further processed to provide sheets of a desired thickness from which discs of the proper size may be stamped and at the same time or subsequently formed into substantially semi-spherical cups, in the usual manner. These cups are then placed over the golf ball core in opposite co-operative core enclosing relation, then under the influence of heat and pressure, the semi-spherical halves are melted and pressed together to form a spherical enclosure for the golf ball with the proper surface markings, the surface marking being determined by the inner surface formed by the press dies.

The above description relates to a typical embodiment of our invention involving a particular routine employed in the manufacture of complete golf balls having covers embodying the improved composition material of our invention. We are aware, however, that the cover material may be employed to cover golf balls in other ways than that described, within the scope of our invention.

While we have above described our invention as used for the purpose of providing improved golf balls comprising covers which include as a principal constituent our composition material as evolved by the described improved process, we are aware that numerous other uses may be made of the improved composition material as above set forth, and it is understood that we do not wish to be limited thereto. For other purposes than golf balls, the proportion might be considerably different within a different range of relative proportions of the composition described.

We therefore claim our invention more broadly than any particular proportion, for general uses.

Although, in the specification and in the appended claims, we have referred to rubber and balata, it will be understood that we contemplate that these terms shall be construed in the broadest sense to include the equivalent material of either natural or synthetic products and independently of their origin; and when such terms are employed in the claims, as a matter of convenience, they are to be construed in the light thereof.

We claim:

1. An improved composition of material comprising as principal constituents, rubber, balata, a synthetic resin formed by polymerization of vinyl acetate, and a synthetic resin formed by the co-polymerization of vinyl acetate and vinyl chloride, and the vinyl acetate resin constituting 20% or less of the total amount of resin.

2. An improved composition of material comprising rubber, balata, a synthetic resin formed by polymerization of vinyl acetate, a synthetic resin formed by the co-polymerization of vinyl acetate and vinyl chloride, the co-polymer resin being substantially greater in amount than the polymer resin and a stabilizing agent.

3. An improved composition of material comprising rubber, balata, calcium stearate, a synthetic resin formed by polymerization of vinyl acetate, a synthetic resin formed by the co-polymerization of vinyl acetate and vinyl chloride, and the co-polymer resin being substantially greater in amount than the polymer resin.

4. An improved composition of material comprising rubber, balata, a synthetic resin formed by polymerization of vinyl acetate, a synthetic resin formed by the co-polymerization of vinyl acetate and vinyl chloride, a stabilizing agent, and coloring pigment, the polymer acetate resin being substantially less in amount than the co-polymer resin, and the total resin content being substantially in excess of the rubber content.

5. An improved cover material for golf balls comprising a substantially homogeneous mixture of unvulcanized refined rubber, unvulcanized substantially pure gum comprising balata or like material, and synthetic resin formed by polymerization of vinyl acetate and co-polymerization of vinyl acetate and vinyl chloride, the polymer acetate resin being substantially less in amount than the co-polymer resin, and the total amount of resin being at least as great as the amount of balata.

6. An improved cover material for golf balls comprising a substantially homogeneous mixture of vulcanized refined rubber, unvulcanized and de-resinated balata or like material, and synthetic resin formed by polymerization of vinyl acetate and co-polymerization of vinyl acetate and vinyl chloride.

7. Cover stock for enclosing golf ball cores comprising a substantially homogeneous mixture of unvulcanized substantially de-resinated balata, unvulcanized refined rubber, synthetic resin formed by polymerization of vinyl acetate and co-polymerization of vinyl acetate and vinyl chloride, the polymer acetate resin being 20% or less in amount relative to the total amount of resin and coloring material.

8. An improved composition of matter comprising unvulcanized balata, unvulcanized rubber, resin formed by polymerization of vinyl acetate, resin formed by co-polymerization of vinyl acetate and vinyl chloride, and the amount of resin formed from vinyl acetate being substantially less by weight than the resin formed from vinyl acetate and vinyl chloride.

9. An improved composition of material adapted as a golf ball cover comprising as principal constituents, rubber, balata, a synthetic resin formed by polymerization of vinyl acetate, and a synthetic resin formed by the co-polymerization of vinyl acetate and vinyl chloride, the polymer acetate resin comprising 20% or less by weight of the total resin content, the rubber and balata used in the composition providing secure seating of the composition on the rubber threads.

10. An improved composition of material comprising rubber, balata, a synthetic resin formed by polymerization of vinyl acetate, a synthetic resin formed by the co-polymerization of vinyl acetate and vinyl chloride, the co-polymer resin being substantially greater in amount than the polymer resin.

11. An improved composition of material comprising rubber, balata, a synthetic resin formed by polymerization of vinyl acetate, a synthetic resin formed by the co-polymerization of vinyl acetate and vinyl chloride, the co-polymer resin being substantially greater in amount than the polymer resin, and a chemical plasticizer.

WILLIS E. REICHARD.
ROBERT R. OLIN.